United States Patent
Damotte

[11] Patent Number: 6,128,554
[45] Date of Patent: Oct. 3, 2000

[54] DEVICE FOR ACTUATING A CONTROLLED MEMBER FOR AN AIRCRAFT, PARTICULARLY SUCH AS A FLY-BY-WIRE HELICOPTER

[75] Inventor: Sylvain Pascal Frédéric Damotte, Eguilles, France

[73] Assignee: Societe Anonyme Dite: Eurocopter France, Marignane Cedex, France

[21] Appl. No.: 08/576,199

[22] Filed: Dec. 21, 1995

[30] Foreign Application Priority Data

Dec. 21, 1994 [FR] France .................................. 94 15404

[51] Int. Cl.$^7$ ............................ B64C 13/00; G06F 17/00
[52] U.S. Cl. ................................. 701/4; 244/223; 318/628
[58] Field of Search ..................... 364/424.012, 424.013; 244/221, 223, 228, 232; 318/628, 584, 585, 586

[56] References Cited

U.S. PATENT DOCUMENTS

| | | | |
|---|---|---|---|
| H703 | 11/1989 | Reperger et al. | 244/221 |
| 4,345,195 | 8/1982 | Griffith et al. | 318/628 |
| 4,500,967 | 2/1985 | Murphy et al. | 364/434 |
| 4,527,242 | 7/1985 | McElreath et al. | 364/434 |
| 4,603,388 | 7/1986 | Griffith et al. | 364/433 |
| 4,607,202 | 8/1986 | Koenig | 318/628 |
| 5,059,882 | 10/1991 | Marcillat et al. | 318/675 |
| 5,489,830 | 2/1996 | Fernandez | 318/628 |

FOREIGN PATENT DOCUMENTS 2330591  6/1977  France .

*Primary Examiner*—Michael Zanelli
*Attorney, Agent, or Firm*—Stevens, Davis, Miller & Mosher, L.L.P.

[57] ABSTRACT

A device for actuating a controlled member of an aircraft includes an intentional control member for actuation by the pilot, a computer for piloting on the basis of the action of the pilot on the intentional control member, a controlled member actuator for actuating the controlled member under control of the computer and a slaving device for slaving the position of the intentional control member to the position of the controlled member.

16 Claims, 2 Drawing Sheets

DEVICE FOR ACTUATING A CONTROLLED MEMBER FOR AN AIRCRAFT, PARTICULARLY SUCH AS A FLY-BY-WIRE HELICOPTER

FIELD OF THE INVENTION

The present invention relates to a device for actuating a controlled member for an aircraft, particularly such as a fly-by-wire helicopter. In the case of a helicopter, the controlled member could be the main rotor.

DESCRIPTION OF RELATED ART

In aircraft equipped with fly-by-wire, the actions of the pilot are generally measured on the basis of information on displacement of a control member (for example a stick, ministick or rudder bar), which are converted into a piloting demand by the flight computer which has control of the corresponding controlled member(s) (actuators) so that the piloting demand is fulfilled. This displacement generally takes place by action of the pilot through an elastic link for return to the neutral position, which is generally provided by a motor. The essential advantage provided by control members of this type consists in the force gradient giving the pilot information feedback (a tactile sensation) on the amplitude of the displacement demanded. However, in order to keep the control member in an anchor position fixed by the pilot, while the latter relaxes his action on the control member, it is necessary to provide a device for disengaging and recentering of forces, generally called "trim release" in aeronautics, or for slow alteration of the reference anchoring, called "beep trim". Such devices are controlled by buttons provided on the control member, actuating the motor thereof which acts on the elastic return means.

This control device is completely satisfactory for so-called "conventional" piloting laws, that is to say laws based on a direct stick-servocontrol link to which are added piloting aids of limited amplitude, such as stabilization and decoupling.

However, particularly with sophisticated piloting laws for which the direct stick-servocontrol relationship no longer exists, such an application of fly-by-wire commands for an aircraft, these being controlled on the basis of displacements of the abovementioned control member, poses a certain additional number of problems:

there no longer exists a direct relationship between the position of the controlled member or members and that of the control member, so that the pilot no longer knows the margin of control remaining up to the stops, for the same flight situation, with a sophisticated law and with a direct law, the positions of the control member are different, so that the pilot has to manage or suffer this offset when changing laws.

SUMMARY OF THE INVENTION

The purpose of the present invention is to avoid these drawbacks, and the invention relates to an improved device for actuating a controlled member of an aircraft.

To this end, the device for actuating a controlled member for an aircraft, particularly such as a fly-by-wire helicopter, including:

an intentional control member intended to be subjected to the action of the pilot of the aircraft, a computer for piloting on the basis of the action of the pilot on said intentional control member, and means of actuating said controlled member, which are linked to said computer, is noteworthy, according to the invention, in that means are provided for slaving the position of the control member to the position of the controlled member.

Thus, the position of the control member, for example a stick, pedals or a ministick, always represents, for the pilot, the position of the controlled member (a control surface or a rotor), that is to say that it particularly makes it possible to confirm that the action of the pilot on the control member really has been converted into the desired action on the controlled member.

In the case in which the actuation means comprise at least one servocontrol, said servocontrol means may then include a motor intended to displace the control member as a function of the position of said servocontrol.

Moreover, the device may also comprise at least one sensor for detecting the position of the controlled member and the signal from which makes it possible to control the motor for actuating the control member in order to bring it into a position corresponding to that of the controlled member.

In a first case of piloting in displacement mode, the control member is linked to the motor for actuation thereof by a link including elastic return means.

In a second case of piloting in force mode, the control member is linked to the motor for actuation thereof by an essentially rigid link, such as a bar linking the stick to the actuation motor.

Advantageously, a filter is provided between the servocontrol and the motor for actuating the control member.

Moreover, transducer means are provided between the control member and the computer, which, according to the type of piloting, consist of means for recopying the position of the control member or at least one force sensor.

Moreover, a mechanical backup rod linkage can be provided between the servocontrol and the motor for actuating the control member.

For preference, mechanical damping means are associated with said rod linkage, end stops possibly being provided on either side of said mechanical damping means in order to limit the effect thereof. Advantageously, a means is provided for cancelling out the effect of the motor for actuating the control member.

BRIEF DESCRIPTION OF THE DRAWINGS

The figures of the attached drawing will give a good understanding of how the invention can be produced. In these figures, identical references designate similar elements.

DETAILED DESCRIPTION OF THE PREFERRED EMBODIMENT

Figure 1:
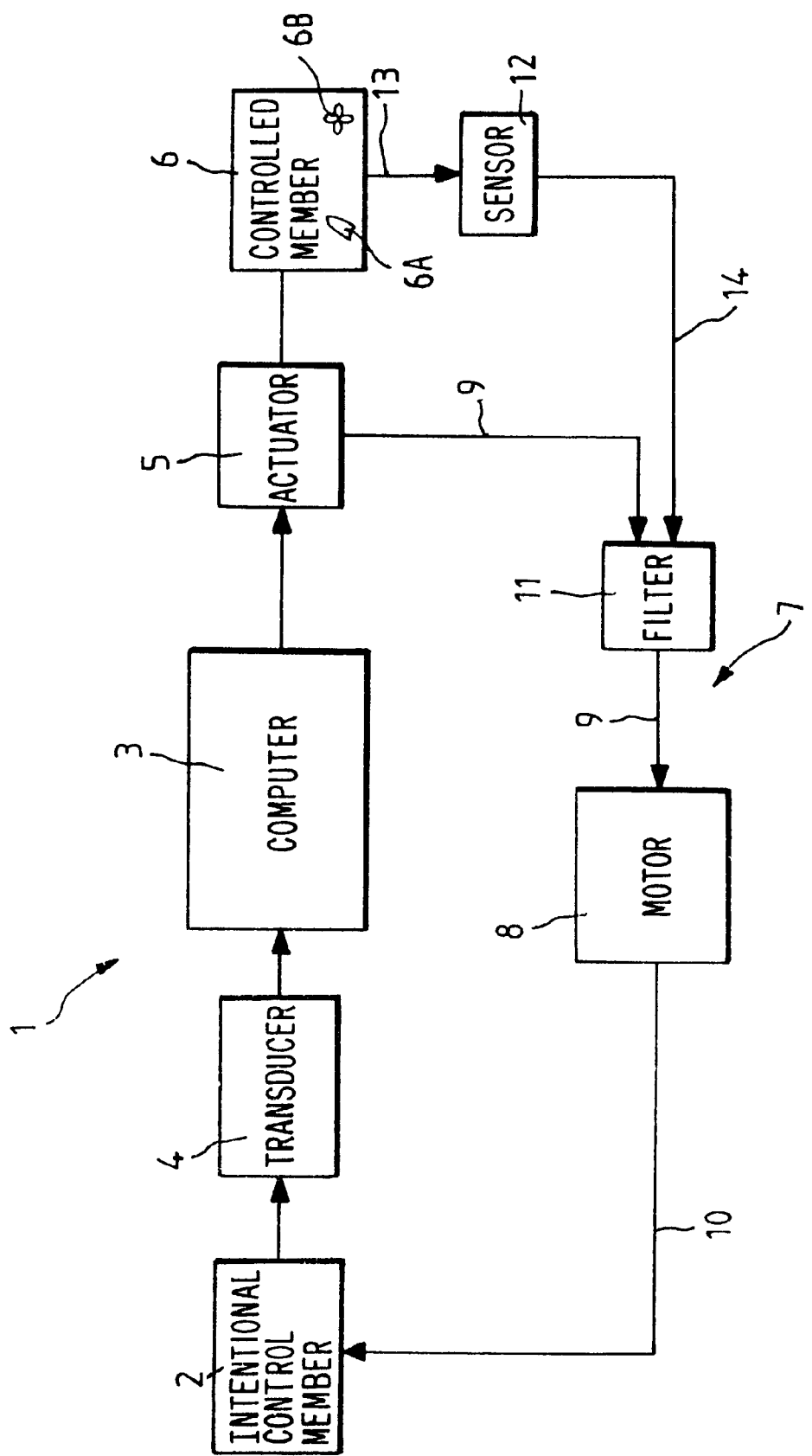
FIG. 1 is a block diagram of the device according to the invention.

As shown in FIG. 1, the device 1 according to the invention comprises an intentional control member 2, which may be a stick, a ministick or a rudder bar and which is intended to be subjected to the action of the pilot of the aircraft, particularly such as a helicopter (not represented).

The device additionally comprises a computer 3 for piloting depending on the action of the pilot on the intentional control member 2. The computer 3 is linked to the control member 2 by means of a transducer 4, described in more detail later. Moreover, the computer 3 is linked to means 5, such as a servocontrol, for actuation of the controlled member 6. The latter may, in the case of an airplane, be a control surface 6A or, in the case of a helicopter, a rotor 6B or a control surface 6A.

In accordance with the invention, means 7 for slaving the position of the control member 2 to the position of the controlled member 6 are provided. More precisely, the slaving means 7 comprise a motor 8, linked, on the one hand, to the servocontrol 5 via a link 9 and, on the other hand, to the control member 2 via a link 10, which motor is intended to displace the control member 2 depending on the position of the servocontrol 5. As shown in FIG. 1, a filter 11 may be provided between the servocontrol 5 and the motor 8.

At least one sensor 12 may also be provided, linked to the controlled member 6 via the link 13 and to the motor 8 via the link 14, to detect the position of the controlled member, the signal from which makes it possible to control the motor 8 for actuating the control member 2 so as to bring it into a position corresponding to that of the controlled member. The sensor 12 could also be incorporated into the servocontrol 5.

Figure 2:
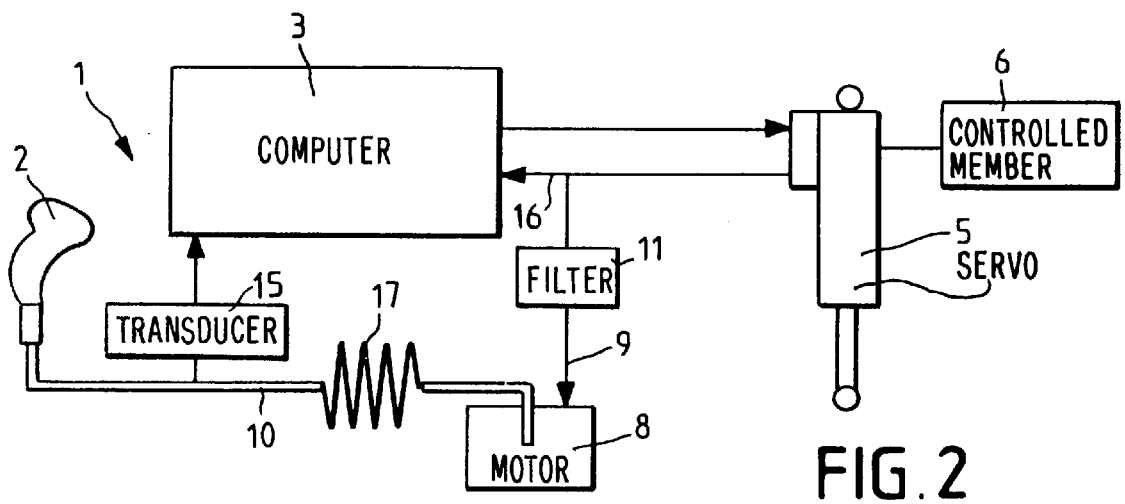
FIG. 2 is a diagram of a first embodiment of the device according to the invention.

FIG. 2 shows a first embodiment of the device 1 according to the invention. In this case, the control member 2, shown by way of illustration in the form of a ministick, acts in displacement mode counter to a return force, making it possible to provide the pilot with force feel. The position of the stick 2 is recopied in the transducer 15 before being supplied to the piloting computer 3 which delivers a control command to the servocontrol 5 according to the general principle described above. In return, the servocontrol 5 supplies information on the execution of this command, on the one hand, to the computer 3 via the link 16 and, on the other hand, to the motor 8 for actuating the stick 2, as described above. In this example, the motor 8 acts, by means of the link 10, on the elastic return members 17 so as to alter their anchoring position, cancelling out their return force. This replaces the conventional disengagement means making it possible to maintain the position of the stick when the latter is released by the pilot.

Figure 3:
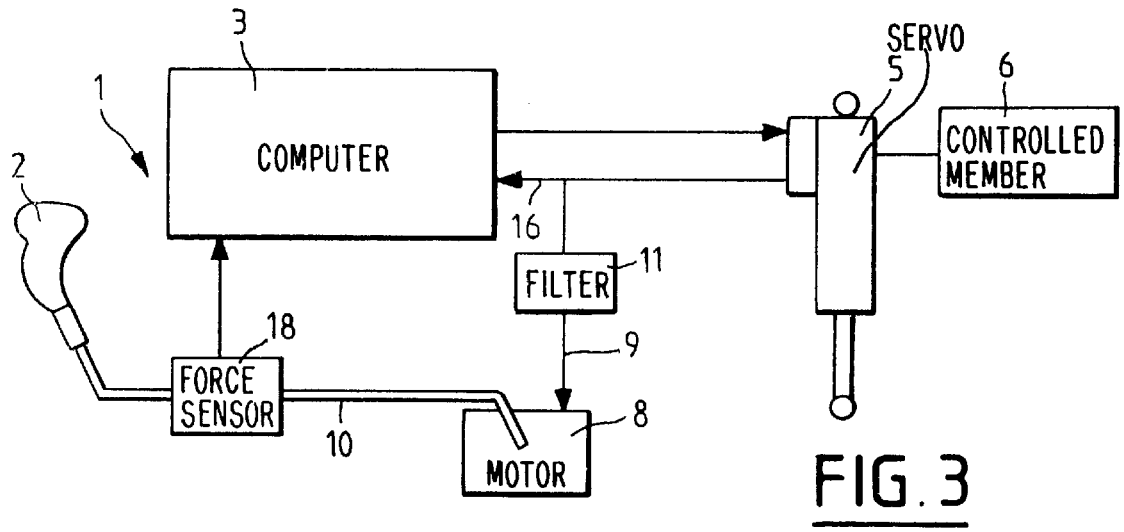
FIG. 3 is a diagram of a second embodiment of the device according to the invention.

FIG. 3 shows the case of piloting in force mode, in which a force sensor 18 detects the force exerted on the stick 2 by the pilot (without significant displacement of the stick) and retransmits it to the computer 3.

In this context, it will be noted, as will be seen in more detail later, that this type of piloting exhibits a certain number of advantages with respect to the previously mentioned piloting in displacement mode.

Moreover, in the example of FIG. 3, the stick 2 is linked to the motor 8 via an essentially rigid linking bar 10, that is to say a bar which is possibly slightly deformable, allowing the motor 8 to slave the position of the stick 2 to the position of the controlled member 6, by means of the servocontrol 5.

Figure 4:
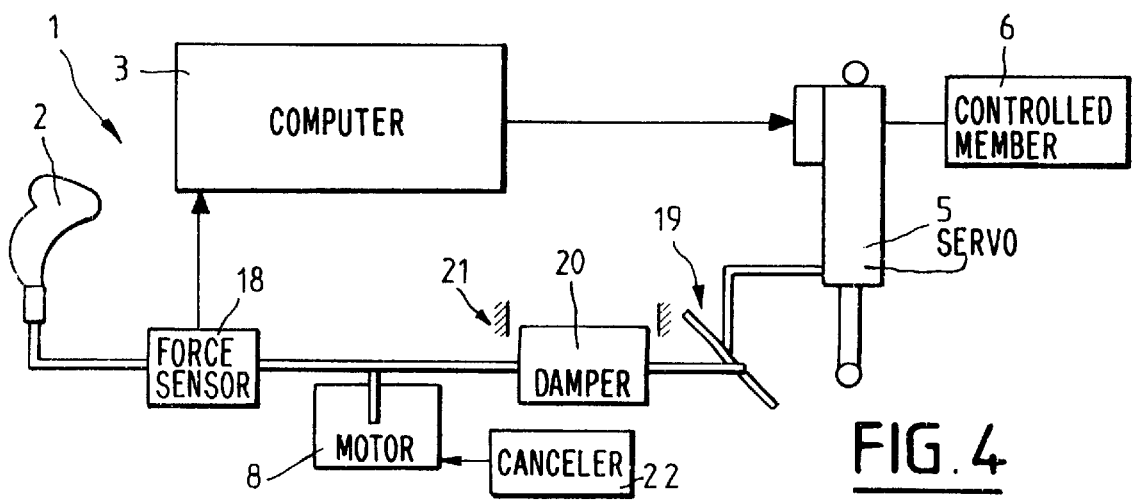
FIG. 4 shows a mechanical backup rod linkage which can be used in the embodiment of FIG. 3.

In this latter case, as is seen in FIG. 4, a mechanical backup rod linkage 19 can be provided between the servocontrol 5 and mechanical damping means (damping spring) 20, the end stops 21 of which additionally limit the force. The rod linkage makes it possible to recopy the position of the controlled member onto the stick, via the servocontrol, in the event of failure of the fly-by-wire system. Moreover, a means 22 for cancelling the effect of the motor 8 for driving the control member 2 can be provided, for example a clutch or a cutoff of the power supply of the motor.

In the case of piloting in force mode, the stick is linked rigidly to the anchoring motor, which is itself slaved to the position of the servocontrol. With the stick following the position of the servocontrol, to within a dynamic offset, mechanical backup with the same stick can therefore be envisaged. The offsets are absorbed by a passive mechanical filter (spring and damper) capable of filtering, among others, the movements due to the multicyclic control. End stops are provided on either side of the filter to provide a limitation covering the cases of bottoming of the servocontrol. Changing from the electrical mode to the mechanical mode is controlled either by the action of the pilot, or by an automatic reconfiguration of the fly-by-wire system in the event of a major failure, the transition taking place without jerks by freeing the stress on the spring.

In normal operation, the spring makes it possible to absorb the dynamic offsets between the servocontrol and the anchoring motor. In the event of a breakdown, it replaces the servocontrol on the position of the stick. For reasons of bulk, the linkages between the servocontrol and the anchoring motor can take the form of cables. The same is true for the mechanical mixer provided between them.

From the foregoing, it will thus be seen that the pilot can act either by displacement of the stick, or by application of a force thereto.

However, in all cases, only the displacement of the stick depending on the position of the control surfaces makes it possible naturally to restore the position of the rotor and the margin of control, that is to say as with a conventional stick. In fact, force alone cannot restore the margin of control when the pilot is not acting on the controls. This case is encountered, for example, when the pilot demands collective pitch and when he does not take action on the rudder bar. The rear servocontrol moves towards its end stop and the increase in force does not warn the pilot. Displacement of the pedals, on the other hand, informs the pilot of the position of the rotor at any instant. The slaving of the anchoring position of the sticks to the position of the servocontrols is thus indispensable to meet all the operational requirements.

The principle of piloting by demand corresponds to a gradation of the action of pilot in terms of demand, and no longer in terms of position of the control surfaces as in conventional controls. This change of link (stick/control surface in action/demand mode) makes it possible to present the crew with an ideal machine. Piloting is achieved by corrective actions around the anchoring position, giving rise to the notion of relative position or of relative action to achieve piloting and of absolute position to restore the position of the rotor.

Piloting by demand can be envisaged either via a displacement of the stick (FIG. 2), or by the application of a force (effort) thereto (FIG. 3).

Piloting by displacement is very precise as to the objective to be achieved, but calls for great mechanical precision in the stick (absence of play, minimum friction) for fear of generating involuntary orders (pilot-induced oscillation, control delay, jerky control). For piloting by demand, the equilibrium position of the stick (zero force) corresponds to a parameter being held. The correct slaving transition (demand/hold parameter) also depends on mechanical precision. It is often necessary to add a switch link in order to determine the hold phase. Moreover, in order to obtain high control precision, it is necessary to have substantial piloting excursions, which is all the more troublesome for recognizing the movements of the pilot and those of the fly-by-wire system. The control sensitivity curve is therefore difficult to set up, particularly for large excursions.

In the case of piloting in force mode, only the application of a force to the stick generates a piloting command. The mechanical play and friction, restricted in this solution, pose no problem in phase transitions (demand/hold). Piloting in force mode exhibits the advantage of not being combined with displacements to restore the control margin. The force/demand sensitivity curve can easily be modified since it is independent of the movement of the stick. With such a system, the precision of the piloting is related to the force sensitivity and not to the sensitivity in terms of displacement, in contrast to conventional piloting. This is a determining factor for the use of ministicks, the excursions of which are much smaller than conventional sticks.

The law for starting up the rotor, takeoff and landing, which is best adapted to all configurations, is the direct law. This law is also necessary in an emergency to cover the cases of breakdown of the force sensors. Switching between the laws by demand and this direct law is therefore necessary.

In the case of piloting by demand in displacement mode, at the very least in the conventional configuration, without slaving of the control member to the controlled member, the position of the stick/positions of the servocontrols one-to-one correspondence is not guaranteed, which poses a problem in switching laws. This discontinuity in the laws can be handled only by complex strategies. This change, occurring in critical phases of flight, entails difficulties in optimization.

Moreover, in the case of the direct piloting law in displacement mode, the sensitivity of the stick is dictated by the correspondence between the excursions of the sticks and those of the control surfaces. This point is very much of a penalty with a ministick, the excursion of which is limited.

In the case of piloting by demand in force mode, with restoration, according to the invention, of the position of the rotor, the stick continuously regains the position of the servocontrol. Switching of the laws becomes natural, with a slight discontinuity (dynamic offset between the anchoring motor and the servocontrol). Moreover, the sensitivity of the stick can be matched independently in all the laws.

Moreover, it has proved to be that two-man piloting (pilot and copilot) generally poses problems of control priority and of synchronization of sticks.

Thus, in the case of piloting in displacement mode, problems are posed in positioning the opposite stick; tracker on the position of the stick, tracker on the anchoring position, and switching of the sticks without giving rise to jerks in the servocontrols. However, such a problem does not exist in the case of piloting in force mode according to the invention. The anchoring position is common to the two sticks, and the commands in force mode from the pilot and from the copilot are summed with no problem of priority as on conventional sticks linked mechanically to each other. Moreover, a priority button can be provided to cancel the effects of the other stick in the event of failure.

Moreover, in the case of piloting in force mode, the copilot or the pilot can monitor the actions demanded by the pilot or the copilot by assessing the displacement of his stick. This concept also makes it possible to initiate the crew into the decoupling performed by the system, by following the movements of the stick. This learning makes it possible not to lose the reflexes necessary for piloting according to a direct law. It is not possible to achieve this for piloting in displacement mode, at the very least in the conventional configuration.

Moreover, it should be noted that piloting in displacement mode dictates considerable and sophisticated mechanics in order to be agreeable for piloting and in order to eliminate play and friction. The adjustments are limited and difficult to carry out in a confined space, while the weight constitutes an unfavorable factor.

In contrast, the technology of force sensors, for example based on strain gauges or on inductive sensors, is reliable and well understood. However, high precision for the force sensors is not necessary since the pilot reacts in a relative way with respect to the foregoing sensations. Calibration of the strain gauges therefore does not pose a problem. Moreover, this technology considerably reduces the force discontinuities by comparison with conventional systems based on force rods. The small size is also a beneficial criterion which offers the possibility of replicating sensors at will and, in the case of ministicks, of incorporating the motors and force sensors assembly in the armrest of the seat.

Moreover, in the case of piloting in displacement mode, the limitations are restored in a tactile way by increasing the forces by use of sophisticated mechanics which can become degraded (lock-up or bottoming of the motor), whereas, in the case of piloting in force mode, the limitations are restored by changing the sensitivity of the stick, in a programmed way. The implementation is simple and, in the case of changing of forces upon limitations, piloting remains possible without discontinuity. A control (particularly a button) can be provided to dispense with the change of sensitivity.

We will now tackle a few problems relating to the safety of the system.

In the case of piloting in force mode according to the invention, the pilot and the copilot know at all times what the piloting system is carrying out (via the displacement of the anchoring of the stick) and, at any moment, can counter its action, particularly by decoupling of the controls. This is not true in a system of piloting in displacement mode, in any event according to the conventional principle in which the action of the system is felt only by the attitudes which the helicopter takes up or by forces on the stick if the pilot is acting on the control.

The concept of pilot in force mode moreover offers the advantage of making available a system having full authority over the control surfaces, subject to monitoring by the pilot.

The number of mechanical parts in motion for piloting in displacement mode is greater than for piloting in force mode, which increases the risks of failure (lock-up or bottoming, for example). In such a case, piloting in displacement mode becomes dangerous, or even impossible. Moreover, in the event of failure of the motor for anchoring the stick, piloting in force mode remains operational despite uncomfortable positions of the stick and a loss of the restoration of the control margins on the unserviceable stick.

In the event of loss of the force measurement, reconfiguration into piloting in displacement mode can easily be performed, the stick being correctly positioned with respect to the servocontrol: the transition occurs naturally without discontinuity. Moreover, in the event of lock-up of the motor for anchoring the stick, piloting in force mode remains operational, with the loss of the restoration of control margins.

Moreover, it should be noted that the law of piloting in force mode is of simple design, since it does not impose limitations of authority on the servocontrols (full-authority system), in contrast to traditional systems with laws of piloting in displacement mode of the automatic pilot type, which have an authority for reasons of safety.

That being so, the law of piloting in force mode is homogenous in all flight domains. Moreover, for the law of piloting in force mode, it is simple to carry out adjustment of the sensitivity, since it is done independently of the position of the stick (like traditional systems of the automatic pilot type) simply by adapting the gradient (sensitivity) of the force/angular speed demand in the calculation algorithm. Moreover, this algorithm advantageously makes it possible, in real time, during the flight, to change this gradient as a function of the states of the helicopter (for example: air speed, limitations of the machine), by matching the force/piloting datum curve.

Moreover, by virtue of the improvement of the invention, in the event of loss of attitude sensors, the system reconfigures itself without a change to piloting in direct law mode, only the loss of assistance being noticed. In the event of loss of the force information, the system can reconfigure itself by using the positional information of the anchoring motor. With the stick being correctly placed with respect to the servocontrol, the transition occurs naturally. Moreover, no limitation in authority of the system with respect to the conventional law in displacement mode or switching to nominal law (except for switching to direct law mode for landings, takeoffs, particularly) or switching to degraded law, is necessary for the law in force mode.

Advantageously, the introduction of higher modes (attitude hold, heading hold, height hold, particularly) is achieved simply by taking account of the offset between the hold datum value and the corresponding sensor in slaving the abovementioned law by demand, in the context of the integral term.

What is claimed is:

1. A device for actuating a controlled member for an aircraft, the device comprising:
    an intentional control member for receiving an action of a pilot of the aircraft;
    a computer for piloting the aircraft in accordance with the action of the pilot on said intentional control member;
    controlled member actuating means for actuating said controlled member under control of said computer; and
    slaving means for slaving a position of the intentional control member to a position of the controlled member.

2. The device as claimed in claim 1, wherein:
    the controlled member actuating means comprises at least one servocontrol; and
    said slaving means comprises a motor for displacing the intentional control member as a function of a position of said at least one servocontrol.

3. The device as claimed in claim 2, wherein the slaving means further comprises a link for linking the intentional control member to the motor for actuation of the intentional control member by the motor, the link comprising elastic return means for supplying a return actuation to the intentional control member in response to the actuation by the pilot.

4. The device as claimed in claim 2, wherein the slaving means further comprises an essentially rigid link for linking the intentional control member to the motor for actuation of the intentional control member by the motor.

5. The device as claimed in claim 2, further comprising a filter, provided between the at least one servocontrol and the motor, for filtering a signal supplied by the at least one servocontrol to the motor.

6. The device as claimed in claim 2, wherein the slaving means further comprises a mechanical backup rod linkage provided between the at least one servocontrol and the motor for actuating the intentional control member.

7. The device as claimed in claim 6, wherein the slaving means further comprises mechanical damping means for damping a motion of said rod linkage.

8. The device as claimed in claim 7, wherein the slaving means further comprises end stops provided on either side of said mechanical damping means in order to limit a mechanical damping effect of the mechanical damping means.

9. The device as claimed in claim 6, further comprising canceling means for canceling operation of the motor.

10. The device as claimed in claim 1, further comprising at least one sensor for detecting the position of the controlled member and outputting to the slaving means a signal indicating the position of the controlled member, the signal controlling the slaving means to actuate the intentional control member in order to bring the intentional control member into a position corresponding to the position of the controlled member.

11. The device as claimed in claim 1, further comprising transducer means, provided between the intentional control member and the computer, for detecting the actuation by the pilot on the intentional control member and outputting to the computer a signal representing the actuation by the pilot on the intentional control member.

12. The device as claimed in claim 11, wherein said transducer means comprises means for recopying the position of the intentional control member.

13. The device as claimed in claim 11, wherein said transducer means comprises at least one force sensor.

14. The device as claimed in claim 1, wherein:
    the aircraft is an airplane; and
    the controlled member comprises a control surface of the airplane.

15. The device as claimed in claim 1, wherein:
    the aircraft is a helicopter; and
    the controlled member comprises a control surface of the helicopter.

16. The device as claimed in claim 1, wherein:
    the aircraft is a helicopter; and
    the controlled member comprises a rotor of the helicopter.

* * * * *